United States Patent [19]

Inagaki et al.

[11] Patent Number: 5,474,369
[45] Date of Patent: Dec. 12, 1995

[54] BRAKING FORCE CONTROL SYSTEM OF VEHICLE

[75] Inventors: Hiromi Inagaki; Wataru Saito; Kazuya Sakurai; Yoshimichi Kawamoto; Shinji Suto, all of Saitama, Japan

[73] Assignee: Honda Giken Kogyo Kabushiki Kaisha, Tokyo, Japan

[21] Appl. No.: 179,723

[22] Filed: Jan. 11, 1994

[30] Foreign Application Priority Data

Jan. 13, 1993 [JP] Japan .................................. 5-004259
Sep. 3, 1993 [JP] Japan .................................. 5-220136

[51] Int. Cl.$^6$ .................................................. B60T 8/64
[52] U.S. Cl. ........................... 303/146; 303/3; 303/15; 303/155; 364/424.05; 364/426.01
[58] Field of Search ................................. 303/3, 15, 91, 303/100, 103, 105, 111, 113.4; 364/424.05, 426.01

[56] References Cited

U.S. PATENT DOCUMENTS

| | | | |
|---|---|---|---|
| 4,898,431 | 2/1990 | Karnopp et al. | 303/100 |
| 4,940,291 | 7/1990 | Sato . | |
| 5,079,708 | 1/1992 | Brown . | |
| 5,206,808 | 4/1993 | Inoue et al. | 303/100 X |
| 5,228,757 | 7/1993 | Ito et al. | 303/100 |
| 5,229,944 | 7/1993 | Yasuno | 303/100 X |
| 5,261,730 | 11/1993 | Steiner et al. . | |
| 5,322,352 | 6/1994 | Ohno et al. | 303/3 |
| 5,341,297 | 8/1994 | Zomotor et al. . | |

FOREIGN PATENT DOCUMENTS

| | | |
|---|---|---|
| 3900241 | 1/1989 | Germany . |
| 3919347 | 6/1989 | Germany . |
| 4102497 | 1/1991 | Germany . |
| 4123235 | 7/1991 | Germany . |

*Primary Examiner*—Robert J. Oberleitner
*Assistant Examiner*—Lee W. Young
*Attorney, Agent, or Firm*—Armstrong, Westerman, Hattori, McLeland and Naughton

[57] ABSTRACT

A braking force control system of a vehicle, capable of independently controlling at least braking forces of front wheel brakes, a braking force of a left rear wheel brake and a braking force of a right rear wheel brake. The braking force control system includes front wheel-side controls for controlling the braking forces of the front wheel brakes on the basis of a quantity of operation of a brake operating member and a deceleration of the vehicle, and rear wheel-side controls for independently controlling the braking forces of the left rear wheel brake and the right rear wheel brake on the basis of a turning level of the vehicle. Thus, it is possible to provide a sufficient braking force, while stabilizing the behavior of the vehicle, during braking in a turning state of the vehicle, by conducting a control of deceleration for the front wheels increased in load during braking, and by conducting a control of turning for the rear wheels largely contributing to the control of turning.

7 Claims, 9 Drawing Sheets

BRAKING FORCE CONTROL SYSTEM OF VEHICLE

BACKGROUND OF THE INVENTION

1. Field of the Invention

The present invention relates to a braking force control system in a vehicle, capable of independently controlling at least braking forces of front wheel brakes, a braking force of a left rear wheel brake and a braking force of a right rear wheel brake.

2. Description of the Prior Art

Such a control system has been conventionally known, for example, from Japanese Patent Application Laid-open No. 178062/89.

In the above prior art system, the left and right wheel brakes exhibit an equal braking force during a normal braking, other than a braking in an anti-lock control. Therefore, during braking in a turning state of the vehicle, the lateral force is changed from that during non-braking. This is mainly because of a variation in lateral force due to a displacement of load at a time of braking in the turning state of the vehicle, and also because of a variation in lateral force due to a variation in slip rate. Thereupon, it is conceived to provide a desirable turning state by producing a difference between the braking forces of the left and right wheel brakes during braking in the turning of the vehicle, but on the other hand, it is also necessary to provide a reliable braking force.

SUMMARY OF THE INVENTION

Accordingly, it is an object of the present invention to provide a braking force control system in a vehicle, wherein the behavior of the vehicle can be stabilized and, at the same time, a sufficient braking force can be provided during braking in the turning of the vehicle.

To achieve the above object, according to a first aspect and feature of the present invention, there is provided a braking force control system, in a vehicle, capable of independently controlling at least braking forces of front wheel brakes, a braking force of a left rear wheel brake and a braking force of a right rear wheel brake, comprising front wheel-side control means for controlling the braking forces of the front wheel brakes on the basis of a quantity of operation of a brake operating member and a deceleration of the vehicle; and rear wheel-side control means for independently controlling the braking forces of the left rear wheel brake and the right rear wheel brake on the basis of a turning level of the vehicle.

With the above arrangement, it is possible to provide a sufficient braking force, while stabilizing the behavior of the vehicle during braking in a turning state of the vehicle, by performing a control of deceleration for the front wheels increased in load during braking and by performing a control of turning for the rear wheels largely contributing to the control of turning.

In addition, according to a second aspect and feature of the present invention, there is provided a braking force control system, in a vehicle, capable of independently controlling at least braking forces of front wheel brakes, a braking force of a left rear wheel brake and a braking force of a right rear wheel brake, comprising brake operation quantity detecting means for detecting an amount of operation of a brake operating member; a deceleration detecting means for detecting a deceleration of the vehicle; target deceleration determining means for determining a target deceleration of the vehicle on the basis of a detection value detected by the brake operation quantity detecting means; steered quantity detecting means for detecting a steered quantity; vehicle speed detecting means for detecting a vehicle speed; turning level detecting means for detecting a turning level of the vehicle; target turning level determining means for determining a target turning level of the vehicle on the basis of detection values detected by the steered quantity detecting means and the vehicle speed detecting means; front wheel-side control circuit for controlling the braking forces of the front wheel brakes on the basis of outputs from the target deceleration determining means and the deceleration detecting means, so that the deceleration of the vehicle is equal to the target deceleration; and rear wheel-side control circuit for independently controlling the braking forces of the left rear wheel brake and the right rear wheel brake on the basis of outputs from the target turning level determining means and the turning level detecting means, so that the turning level of the vehicle is equal to the target turning level.

With the above arrangement, it is possible to provide a sufficient braking force, while stabilizing the behavior of the vehicle during braking in a turning state of the vehicle, by performing a control of deceleration for the front wheels, increased in load during braking, and by performing a control of turning for the rear wheels largely contributing the control of turning.

Further, according to a third aspect and feature of the present invention, there is provided a braking force control system, in a vehicle, capable of independently controlling at least braking forces of front wheel brakes, a braking force of a left rear wheel brake and a braking force of a right rear wheel brake, comprising brake operation quantity detecting means, for detecting an amount of operation of a brake operating member; total braking force determining means, for determining a total braking force, which is a sum total of braking forces of the brakes, on the basis of a detection value detected by the brake operation quantity detecting means; reference braking force determining means, for determining reference braking forces for the brakes, by distributing the total braking forces in accordance with a load-shared ratio defined for every brake; deceleration detecting means, for detecting a deceleration of the vehicle; target deceleration determining means, for determining a target deceleration of the vehicle on the basis of a detection value detected by the brake operation quantity detecting means; front wheel-side correcting means for correcting a reference braking force for every front wheel on the basis of a deviation between the target deceleration and the detected deceleration; steered quantity detecting means for detecting a steered quantity; vehicle speed detecting means for detecting a vehicle speed; turning level detecting means for detecting a turning level of the vehicle; target turning level detecting means for detecting a target turning level of the vehicle on the basis of detection values detected by the steered quantity determining means and the vehicle speed determining means; rear wheel-side correcting means for correcting a reference braking force for every rear wheel on the basis of a deviation between the target turning level and the detected turning level; and driving means for driving each wheel brake on the basis of the corrected reference braking force.

With the above arrangement, in addition to the reference braking force being determined in accordance with the shared load ratio for each wheel, the feed-back control of the deceleration is carried out for the front wheels, while the feed-back control of the turning quantity is carried out for the rear wheels, thereby making it possible to provide a stabilization of the behavior of the vehicle and a sufficient braking force during braking in a turning state of the vehicle. Moreover, it is possible to avoid the generation of an interference of both the feed-back controls to enable a prompt correction and provide an improved responsiveness.

The above and other objects, features and advantages of the invention will become apparent from the following description of preferred embodiments, taken in conjunction with the accompanying drawings.

BRIEF DESCRIPTION OF THE DRAWINGS

FIGS. 1 to 7 illustrate a first embodiment, wherein

FIG. 1 is an illustration of a braking system in a vehicle;

FIG. 2 is an illustration of the arrangement of a braking fluid pressure circuit;

FIG. 3 is a block diagram illustrating the arrangement of a control unit;

FIG. 4 is a block diagram illustrating the arrangement of a speed-level judging means;

FIG. 5 is a block diagram illustrating the arrangement of a front wheel-side control section;

FIG. 6 is a block diagram illustrating the arrangement of a rear wheel-side control section; and FIG. 7 is a diagram illustrating one example of a variation in quantity of operation of a brake operating member.

FIGS. 8 and 9 illustrate a second embodiment, wherein

FIG. 8 is a block diagram illustrating an arrangement of a control unit; and

FIG. 9 is a diagram illustrating a preset map of the total braking fluid pressure with respect to the brake operation quantity.

DESCRIPTION OF THE PREFERRED EMBODIMENTS

A first embodiment will not be described in connection with FIGS. 1 to 7.

Figure 1:
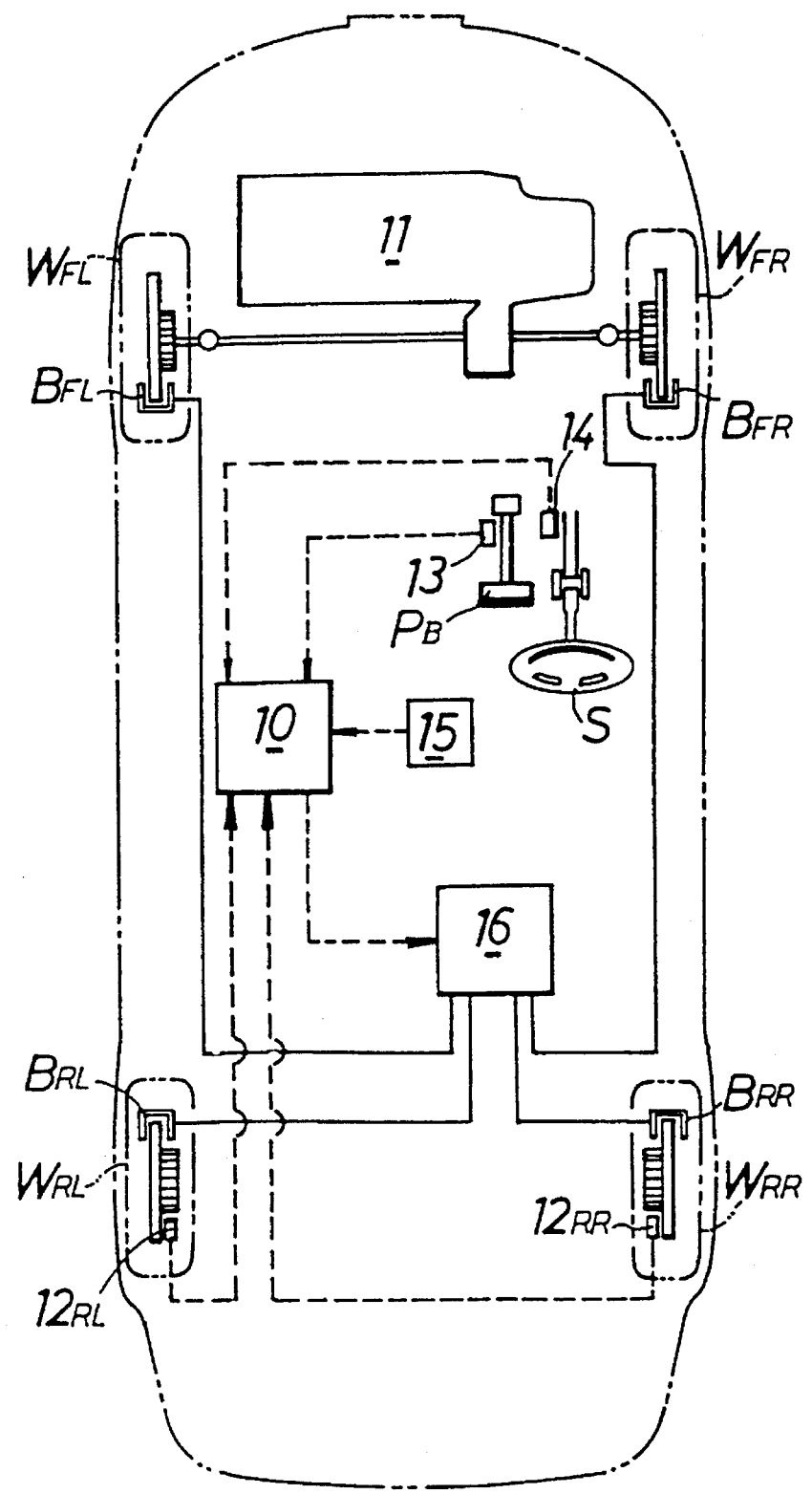

Referring first to FIG. 1, power from a power unit 11, including an engine and a transmission, is transmitted to left and right front wheels $W_{FL}$ and $W_{FR}$ which are driving wheels. Wheel brakes $B_{FL}$ and $B_{FR}$ are mounted on the front wheels $W_{FL}$ and $W_{FR}$. Wheel brakes $B_{RL}$ and $B_{RR}$ are mounted on rear wheels $W_{RL}$ and $W_{RR}$ which are follower wheels. Wheel speed detectors $12_{RL}$ and $12_{RR}$ are also mounted on the rear wheels $W_{RL}$ and $W_{RR}$. A braking fluid pressure is applied from a braking fluid pressure circuit 16 to the wheel brakes $B_{FL}$, $B_{FR}$, $B_{RL}$ and $B_{RR}$.

Figure 2:
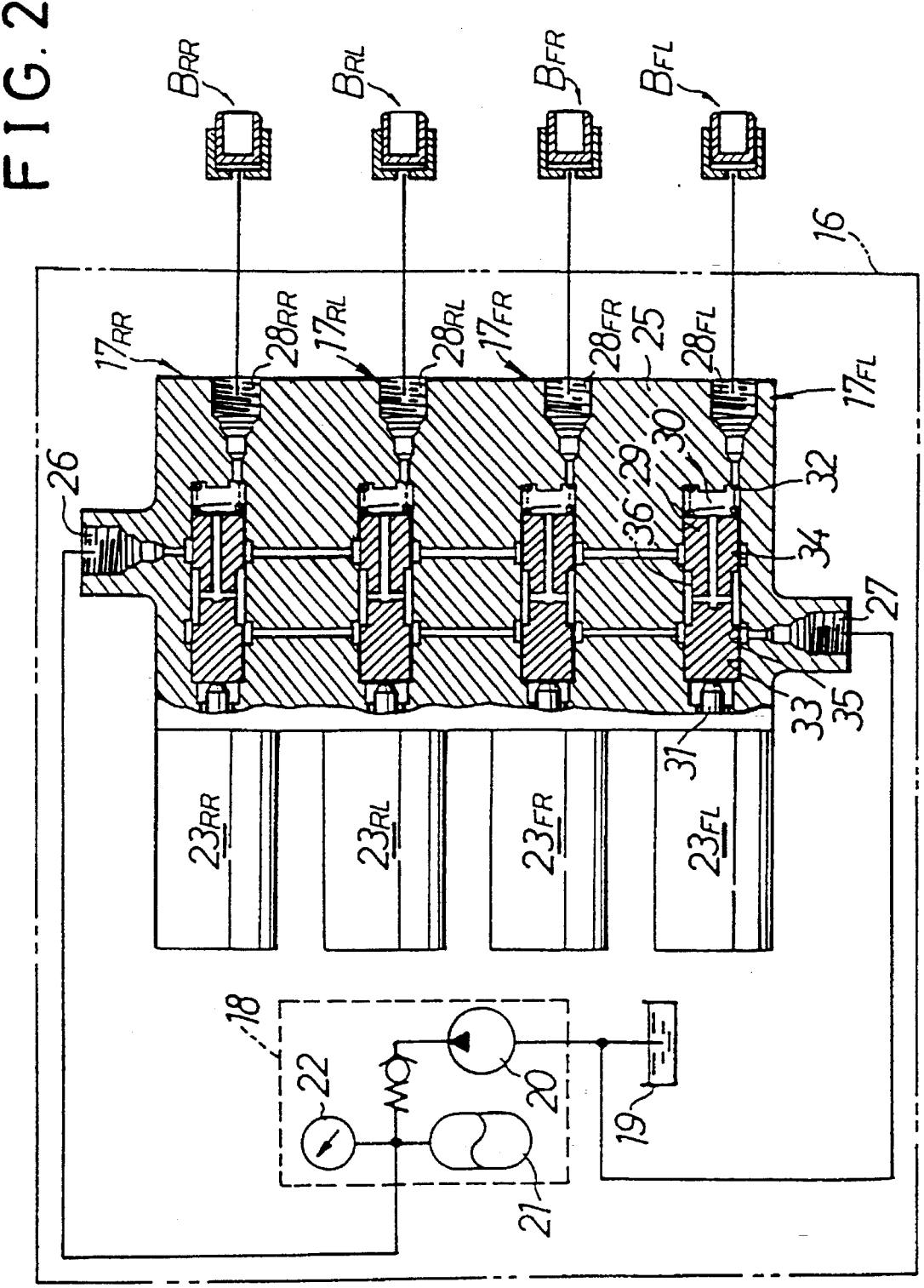

Referring to FIG. 2, the braking fluid pressure circuit 16 includes a modulator $17_{FL}$, serving as an actuator for adjusting the braking force of the left front wheel brake $B_{FL}$, a modulator $17_{FR}$, serving as an actuator for adjusting the braking force of the right front wheel brake $B_{FR}$, a modulator $17_{RL}$, for adjusting the braking force of the left rear wheel brake $B_{RL}$, a modulator $17_{RR}$, for adjusting the braking force of the right rear wheel brake $B_{RR}$, and a fluid pressure source 18 common to the modulators $17_{FL}$, $17_{FR}$, $17_{RL}$ and $17_{RR}$.

The fluid pressure source 18 includes a fluid pressure pump 20 for pumping a working fluid from a working fluid tank 19, an accumulator 21 connected to the fluid pressure pump 20, and a pressure switch 22 for controlling the operation of the fluid pressure pump 20.

The modulators $17_{FL}$, $17_{FR}$, $17_{RL}$ and $17_{RR}$ are juxtaposed in parallel to one another in a common housing 25. These modulators, basically, have the same construction, and therefore, only the modulator $17_{FL}$ will be described below in detail, and the detailed descriptions of the modulators $17_{FR}$, $17_{RL}$ and $17_{RR}$ are omitted.

The housing 25 is provided with an input port 26 connected to the fluid pressure source 18, a release port 27 leading to the working fluid tank 19, and four output ports $28_{FL}$, $28_{FR}$, $28_{RL}$ and $28_{RR}$ individually connected to the brakes $B_{FL}$, $B_{FR}$, $B_{RL}$ and $B_{RR}$, respectively.

The modulator $17_{FL}$ includes a spool 29, slidably received in the housing 25, and a linear solenoid $23_{FL}$, mounted to the housing 25 for urging the spool 29 axially. The linear solenoid $23_{FL}$ has a driving rod 31 coaxially abutting against one end of the spool 29. An output chamber 30 is defined in the housing 25, and the other end of the spool 29 faces the output chamber 30. The output chamber 30 leads to the output port $28_{FL}$, and a return spring 32 is accommodated within the output chamber 30 for biasing the spool 29 toward the linear solenoid $23_{FL}$. Thus, the spool 29 is normally in abutment against the driving rod 31 by a spring force of the return spring 32, and the spool 29 and the linear solenoid $23_{FL}$ are operatively connected to each other.

The housing 25 is provided with a cylinder bore 33 in which the spool 29 is slidably received. Provided in an inner surface of the cylinder bore 33, at axially spaced locations, are an annular groove 34 leading to the input port 26, and an annular groove 35 leading to the release port 27. An annular recess 36 is provided in an outer surface of the spool 29 to normally lead to the output chamber 30. The spool 29 is switched over between a state in which it permits the annular recess 36 to lead to the annular groove 34 to put the input port $28_{FL}$ and the output chamber 30, i.e., the output port $28_{FL}$ into communication with each other, and as that in which it permits the annular recess 36 to lead the annular groove 35 to put the output chamber 30 and the release port 27 into communication with each other, by an axial displacement in position depending upon the magnitude relationship between the thrust of the linear solenoid $23_{FL}$, acting on an axially one end, and the fluid pressure force in the output chamber 30, acting on the axially other end.

The linear solenoid $23_{FL}$ generates a thrust dependent upon an input quantity of electricity received thereto, and the fluid pressure in the output chamber 30, i.e., the fluid pressure applied through the output port $28_{FL}$ to the left front wheel brake $B_{FL}$, can be controlled arbitrarily by controlling the applied electric power quantity of the linear solenoid $23_{FL}$.

Even as to the other modulators $17_{FR}$, $17_{RL}$ and $17_{RR}$, the fluid pressure applied to the wheel brakes $B_{FR}$, $B_{RL}$ and $B_{RR}$ can be, likewise, controlled by controlling the applied electric power quantity of the linear solenoids $23_{FR}$, $23_{RL}$ and $23_{RR}$, as the modulator $17_{FL}$.

Referring again to FIG. 1, the wheel speed detectors $12_{RL}$ and $12_{RR}$, a load cell 13, serving as an operation quantity detecting means, a steering sensor 14 and a deceleration sensor 15, serving as a deceleration detecting means, are connected to a control unit 10. Control unit 10 controls the applied electric power quantity of each of the linear solenoids $23_{FL}$, $23_{FR}$, $23_{RL}$ and $23_{RR}$ in the modulators $17_{FL}$, $17_{FR}$, $17_{RL}$ and $17_{RR}$, FIG. 2, so as to control the braking force of each of the wheel brakes $B_{FL}$, $B_{FR}$, $B_{RL}$ and $B_{RR}$. The load cell 13, FIG. 1 is for detecting a depression force on a brake pedal $P_B$ serving as a brake operating member. However, by arranging the load cell 13 such that a reaction force corresponding to a quantity of depression of the brake pedal $P_B$, i.e., a quantity of operation thereof, is applied to the brake pedal $P_B$, the load cell 13 can also detect the quantity of operation of the brake pedal $P_B$. The steering sensor 14 is added to a steering means S to detect an angle of operation of the steering means S, i.e., a steering quantity. The deceleration sensor 15 detects a longitudinal deceleration of a vehicle.

Figure 3:
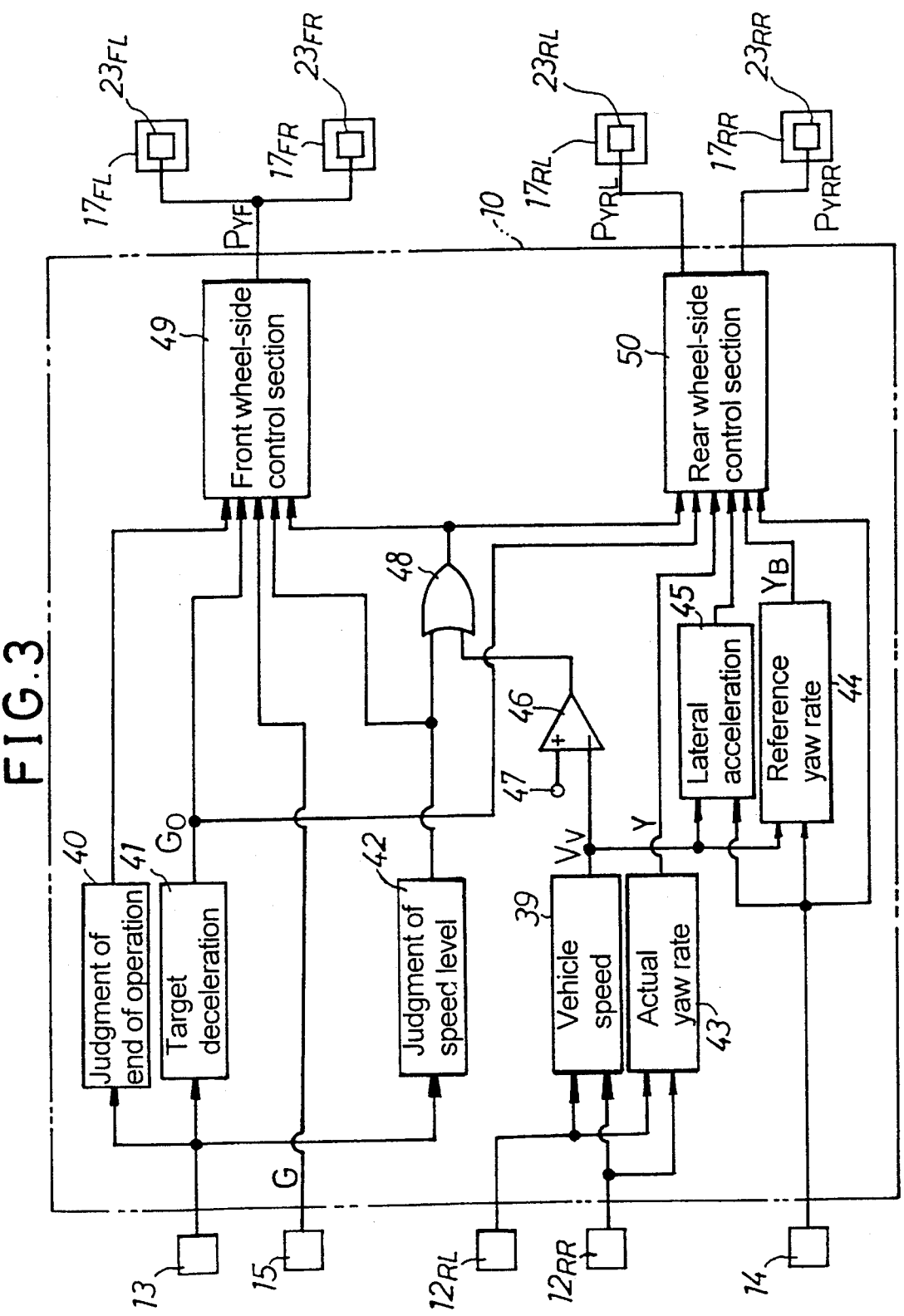

Referring to FIG. 3, the control unit 10 includes a vehicle speed detecting means 39, for calculating a vehicle speed $V_V$ on the basis of detection values detected by the wheel speed detectors $12_{RL}$ and $12_{RR}$, which detect the speeds of the left and right rear wheels $W_{RL}$ and $W_{RR}$, which are the follower wheels; an operation-end judging means, for judging whether or not the operation of the brake pedal $P_B$ is ended, by using a detection value detected by the load cell 13; a target deceleration determining means 41, for determining a target deceleration of the vehicle in accordance with the detection value detected by the load cell 13, i.e., the quantity of operation of the brake pedal $P_B$; a speed-level judging means 42, for judging the level of operation speed in accordance with whether or not a value in variation per unit time in operation quantity detected by the load cell 13 exceeds a preset value; and actual yaw rate detecting means 43 for detecting an actual yaw rate Y which is an actual turning level by a difference between the detection values detected by the wheel speed detectors $12_{RL}$ and $12_{RR}$; a reference yaw rate determining means 44, for determining a reference yaw rate $Y_B$, which is a target turning level, on the basis of the vehicle speed $V_V$ determined in the vehicle speed detecting means 39, as well as a detection value detected by the steering sensor 14; a lateral acceleration evaluating means 45 for evaluating a lateral acceleration of the vehicle on the basis of the vehicle speed $V_V$ and the detection value detected by the steering sensor 14; a comparator 46 for outputting a high level signal when the vehicle speed $V_V$, determined in the vehicle speed detecting means 39, is lower than a judging speed (e.g., 10 km/hr) received thereto through a reference terminal 47; an OR gate 48 into which output signals from the speed-level judging means 42 and the comparator 46 are received in parallel; a front wheel-side control section 49, for collectively controlling the quantities of operation of the modulators $17_{FL}$ and $17_{FR}$, i.e., the applied electric power quantities of the linear solenoids $23_{FL}$ and $23_{FR}$, so as to control the braking forces of the left and right front wheel brakes $B_{FL}$ and $B_{FR}$ to the same level; and a rear wheel-side control section 50, for independently controlling the quantities of operation of the modulators $17_{RL}$ and $17_{RR}$, i.e., the applied electric power quantities of the linear solenoids $23_{RL}$ and $23_{RR}$, so as to independently control the braking forces of the left and right rear wheel brakes $B_{RL}$ and $B_{RR}$.

The operation-end judging means 40 judges whether or not the operation of the brake pedal $P_B$ is ended by the detection value detected by the load cell 13. The operation-end judging means 40 outputs a high level signal, after a lapse of a preset delay time from the judgment of the end of the operation. In the actual yaw rate detecting means 43, and actual yaw rate Y is determined by multiplying a difference between the detection values detected by the wheel speed detectors $12_{RL}$ and $12_{RR}$, which detect the speeds of the left and right rear follower wheels $W_{RL}$ and $W_{RR}$, by a predetermined constant with respect to treads of the left and right rear wheels $W_{RL}$ and $W_{RR}$. In the reference yaw rate determining means 44, a reference value, which is a standard for a yaw rate to be generated when the steering operation in an amount corresponding to the steering angle detected by the steering sensor 14 is performed at the vehicle speed $V_V$, is determined as a reference yaw rate $Y_B$.

Figure 4:
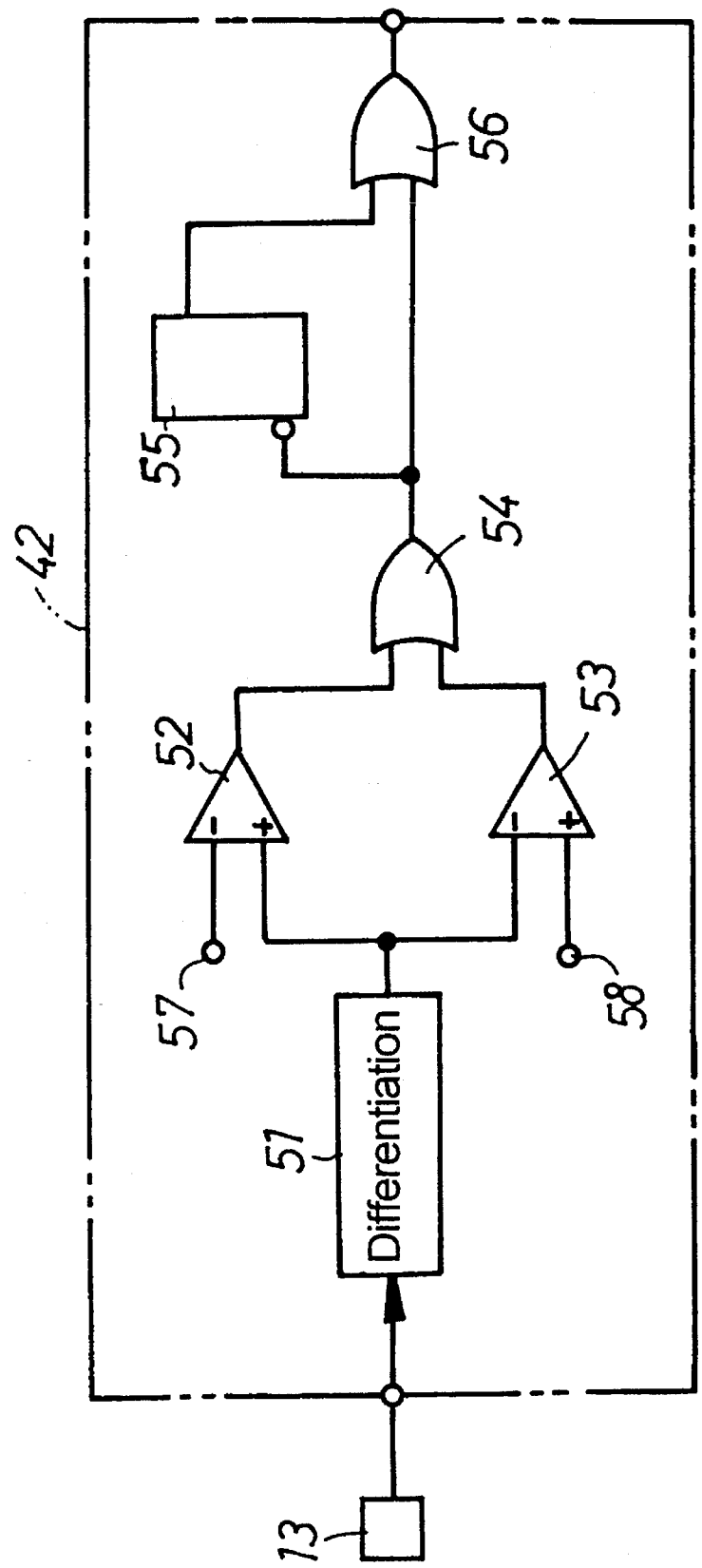

Referring to FIG. 4, the speed-level judging means 42 includes a differentiating circuit 51, a pair of comparators 52 and 53, a monostable circuit 55, and a pair of OR gates 54 and 56.

The differentiating circuit 51 determines a value of variation, per unit time, in the operation quantity applied to the brake pedal $P_B$ by differentiating a depression force obtained in the load cell 13. An output from the differentiating circuit 51 is inputted to a non-inverted input terminal of the comparator 52 and to an inverted input terminal of the comparator 53. Outputs from the comparators 52 and 53 are inputted, in parallel, to the OR gate 54. A threshold value (e.g., +15 kg f/sec), in a depressing direction of the brake pedal, is delivered from the reference terminal 57 to an inverted input terminal of the comparator 52. And a threshold value (e.g., −15 kg f/sec), in a returning direction of the brake pedal, is delivered from a reference terminal 58 to a non-inverted input terminal of the comparator 53. Thus, if one of the speeds of operation of the brake pedal $P_B$, in the depression and returning direction of the pedal, exceeds the respective threshold values, an output from the OR gate 54 becomes a high level.

The monostable circuit 55 outputs a high level signal which is sustained for a given time from an instant when the output from the OR gate 54 is changed from a high level to a low level. The output from the OR gate 54 is applied, in an inverted manner, to the monostable circuit 55. The output from the OR gate 54 and an output from the monostable circuit 55 are applied, in parallel, to the OR gate 56. Thus, when it is decided that the speed of operation of the brake pedal $P_B$ is changed from a low value to a high value (i.e., from a slow braking state to a hard braking state), a high level signal is immediately delivered from the OR gate 56, i.e., from the speed-level judging means 42. However, when the operation speed is changed from the high value to the low value (i.e., from the hard braking state to the slow braking state), the output signal from the speed-level judging means 42 is delayed for a given time and changed from the high level to a low level.

Referring again to FIG. 3, the output signal from the speed-level judging means 42 and the output signal from the comparator 46 are applied, in parallel, to the OR gate 48. The OR gate 48 outputs a high level signal, when at least one of the following two conditions is established; a condition 1) in which the operation speed of the brake pedal $P_B$ is fast, and a condition 2) in which the vehicle speed $v_v$ is lower than a judgment speed, e.g., 10 km/hr.

Figure 5:
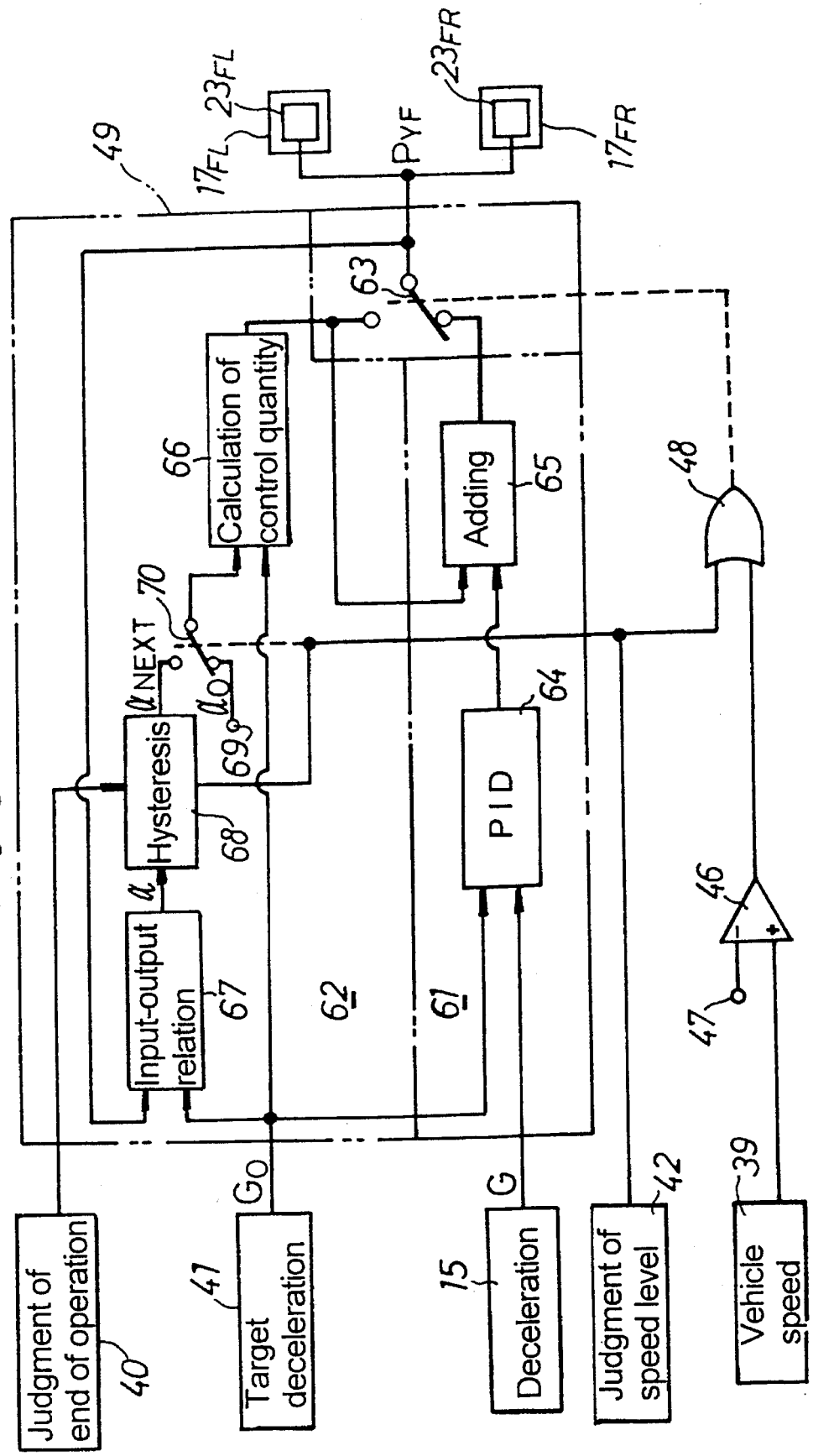

Referring to FIG. 5, the front wheel-side control section 49 includes a deviation reference control quantity determining means 61, for determining an operation control quantity for each of the modulators $17_{FL}$ and $17_{FR}$ on the basis of a deviation between a target deceleration $G_0$, determined in the target deceleration determining means 41, and a deceleration G, detected by the deceleration sensor 15; an operation-quantity reference control quantity determining means 62, for determining an operation control quantity for each of the modulators $17_{FL}$ and $17_{FR}$ on the basis of the target deceleration $G_0$, determined in accordance with the operation quantity detected by the load cell 13; and a switch means 63 (as a switching means) for selecting, as an operation control quantity $P_{YF}$ for each of the modulators $17_{FL}$ and $17_{FR}$, either one of output signals from the deviation reference control quantity determining means 61 and the operation-quantity reference control quantity determining means 62 in accordance with the output signal from the OR gate 48.

The deviation reference control quantity determining means 61 includes a PID calculating circuit 64, for calculating a PID control quantity on the basis of the deviation between the target deceleration $G_0$, determined in the target deceleration determining means 41, and the deceleration G, detected by the deceleration sensor 15; and an adding circuit 65 for adding the PID control quantity determined in the calculating circuit 64 to the control quantity, determined in the operation-quantity reference control quantity determining means 62, to provide an operation control quantity for each of the modulators $17_{FL}$ and $17_{FR}$.

The operation-quantity reference control quantity determining means 62 includes a control quantity calculating circuit 66, for calculating the control quantity in accordance with the target deceleration $G_0$, obtained in the target deceleration determining means 41; an input-output relation calculating circuit 67, for calculating a relation between the target deceleration $G_0$, determined on the basis for the operation quantity, detected in the operation quantity detecting means 13, and a value determined on the basis of the deceleration G, detected by the deceleration sensor 15; a hysteresis calculating circuit 68, for calculating a hysteresis of value obtained in the input-output relation calculating circuit 67; and a switch circuit 70, for selecting any one of a reference terminal 69 and the hysteresis calculating circuit 68 in accordance with the output from the speed-level judging means 42 to supply it to the control quantity calculating circuit 66.

In the control quantity calculating circuit 66, a calculation according to the following equation (1) is carried out on the basis of the target deceleration $G_0$ applied to the circuit 66, and a control quantity $P_y$ is obtained:

$$P_y = \alpha_0 \times G_0 + \beta \tag{1}$$

As can be seen in the above equation (1), the control quantity $P_y$ is given in the form of a primary straight line having an inclination represented by $\alpha_0$ and an intercept represented by $\beta$.

The input-output relation calculating circuit 67 calculates, in terms of $\alpha$, a ratio ($P_{YF}/G_0$) between the target deceleration $G_0$ and the operation control quantity $P_{YF}$, outputted from the switch means 63, as a value determined on the basis of the deceleration G. The hysteresis calculating circuit 68 averages past four values of $\alpha$ applied thereto from the input-output relation calculating circuit 67 to provide an average value $\alpha_{NEXT}$. This hysteresis calculating circuit 68 renewingly repeats such calculation until a high level signal is received thereto from the speed-level judging means 42, but if the high level signal is inputted from the speed-level judging means 42, the circuit 68 retains a value $\alpha_{NEXT}$ at the time when such a high level signal is inputted. Moreover, the hysteresis calculating circuit 68 restores the value $\alpha_{NEXT}$ to an initial value, when a high level signal is inputted thereto from the operation-end judging means 40.

The switch circuit 70 switches over following two states from one to another: a state 1) in which the value $\alpha_0$, inputted to the switch circuit 70 from the reference terminal 69, is applied to the control quantity calculating circuit 66 when the output from the speed-level judging means 42 is of a low level, and a state 2) in which the value $\alpha_{NEXT}$, outputted from the hysteresis calculating circuit 68, is applied to the control quantity calculating circuit 66 when the output from the speed-level judging means 42 is of a high level. Moreover, when the hysteresis calculation value $\alpha_{NEXT}$ is inputted to the control quantity calculating circuit 66 from the hysteresis calculating circuit 68, the control quantity calculating circuit 66 replaces the value $\alpha_0$ in the equation (1) by the hysteresis calculation value $\alpha_{NEXT}$.

The switch means 63 switches over following two states from one to another: a state 1) in which the output from the adding circuit 65, in the deviation reference control quantity determining means 61, is outputted as the operation control quantity $P_{YF}$ when the output from the OR gate 48 is of a low level, and a state in which the output from control quantity calculating circuit 66, in the operation-quantity reference control quantity determining means 62, is outputted as the operation control quantity $P_{YF}$ when the output from the OR gate 48 is of a high level.

By such front wheel-side control section 49, when the vehicle speed $V_V$ is equal to or more than 10 km/hr and when the speed of operation of the brake pedal $P_B$ is slow, the linear solenoids $23_{FL}$ and $23_{FR}$, in the modulators $17_{FL}$ and $17_{FR}$, are controlled in a feed-back manner by the operation control quantity $P_{YF}$ determined in the deviation reference control quantity determining means 61; and either, when the speed of operation of the brake pedal $P_B$ is fast, or when the vehicle speed $V_V$ is less than 10 km/hr, the linear solenoids $23_{FL}$ and $23_{FR}$ are controlled, in an open manner, by the operation control quantity $P_{YF}$ determined in the operation-quantity reference control quantity determining means 62. Moreover, when the feed-back control is changed over to the open control, the relationship of the operation control quantity $P_{YF}$, with respect to the target deceleration $G_0$, is changed on the basis of the hysteresis of the relation between the target deceleration $G_0$ and the operation control quantity $P_{YF}$ during the feed-back control.

Figure 6:
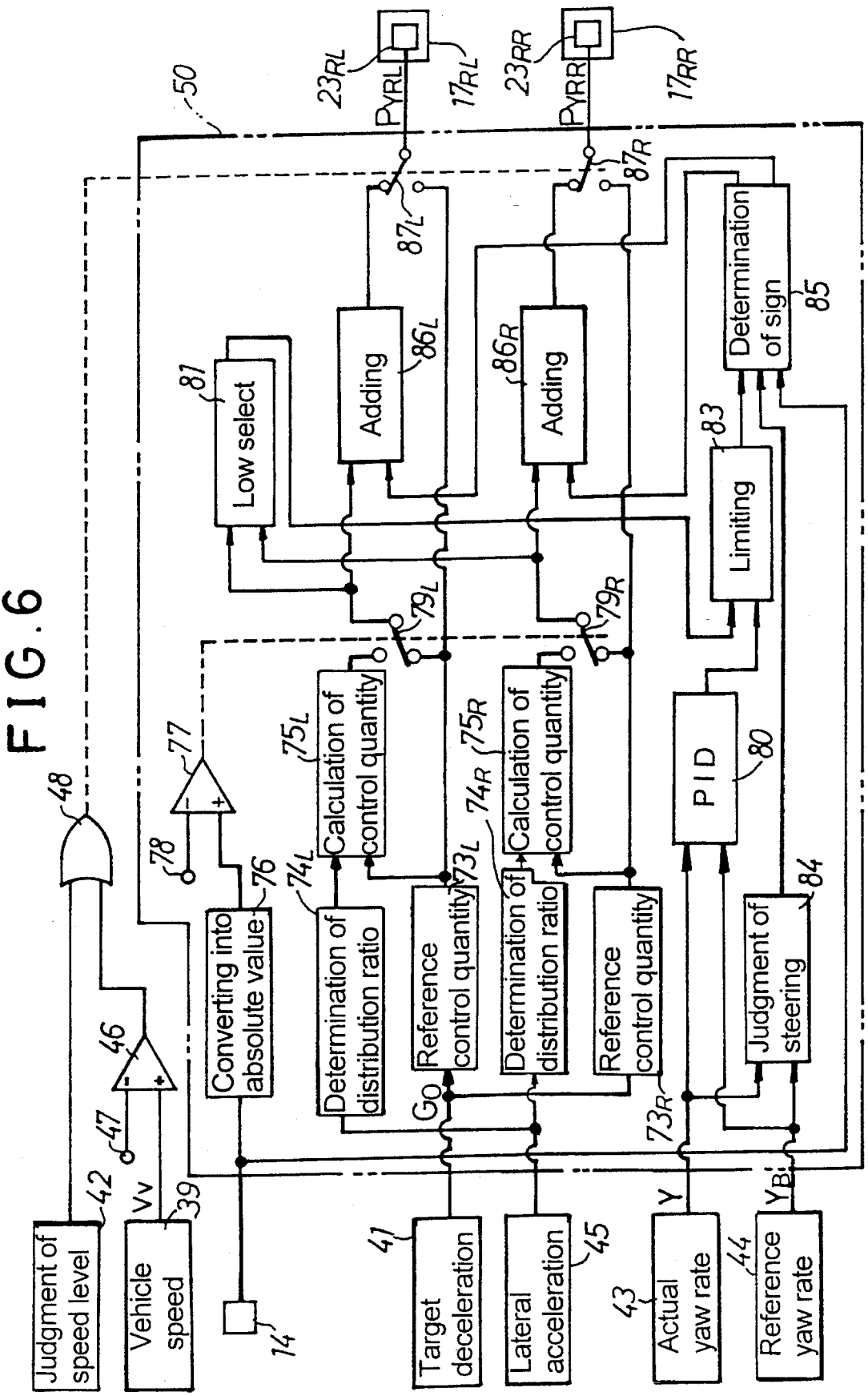
Figure 7:
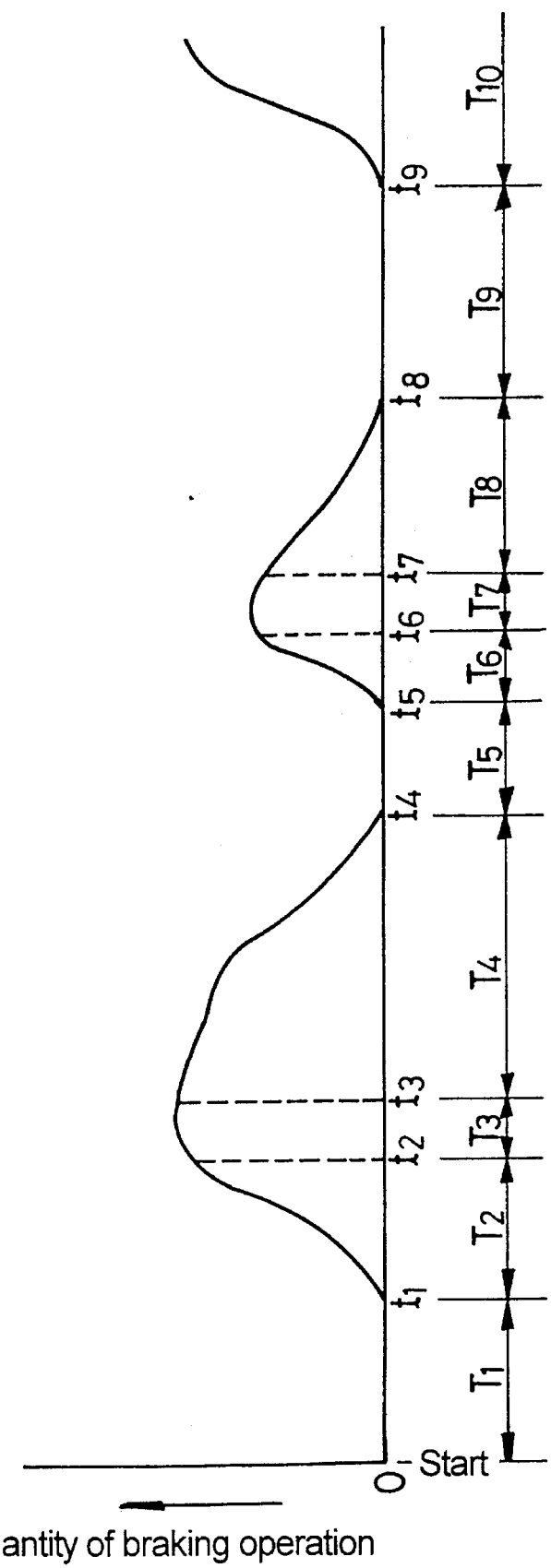

Referring to FIG. 6, the rear wheel-side control section 50 provides a difference between the braking forces of the left and right rear wheels on the basis of a difference between the reference yaw rate $Y_B$ determined in the reference yaw rate determining means 44 and the actual yaw rate Y detected by the actual yaw rate detecting means 43.

The rear wheel-side control section 50 includes reference control quantity determining means $73_L$ and $73_R$ for determining reference control quantities for the linear solenoids $23_{RL}$ and $23_{RR}$ for the left and right rear brakes on the basis of the target deceleration $G_0$ obtained in the target deceleration determining means 41; distribution ratio determining means $74_L$ and $74_R$ for determining a distribution ratio of the braking forces of the left and right rear brakes $B_{RL}$ and $B_{RR}$, respectively, on the basis of the lateral acceleration obtained in the lateral acceleration evaluating means 45; control quantity calculating means $75_L$ and $75_R$ for calculating control quantities for the linear solenoids $23_{RL}$ and $23_{RR}$, respectively, on the basis of reference control quantities determined in the reference control quantity determining means $73_L$ and $73_R$ and on the basis for the distribution ratio determined in the distribution ratio determining means $74_L$ and $74_R$; an absolute value conversion means 76 for converting a detection value detected by the steering sensor 14 into an absolute value; a comparator 77 for outputting a high level signal when the steering angle which has been made into the absolute value in the absolute value conversion means 76 exceeds a judgment steering angle, e.g., 30 degrees, received thereto from an reference terminal 78; switch means $79_L$ and $79_R$ for switching over following two states from one to another: a state 1) in which outputs from the reference control quantity determining means $73_L$ and $73_R$ are selected when the output from the comparator 77 is of a low level, and a state 2) in which outputs from the control quantity calculating means $75_L$ and $75_R$ are selected when the output from the comparator 77 is of a high level; a PID calculating means 80 for calculating a PID control quantity on the basis of the deviation between the reference yaw rate $Y_B$, determined in the reference yaw rate determining means 44, and the actual yaw rate Y, detected by the actual yaw rate detecting means 43; a low selection means 81 for selecting lower one of output signals from the switch means $79_L$ and $79_R$; a limiting means for limiting an output from the PID calculating means 80 such that an output from the low selection means 81 becomes a maximum value; a steered-state judging means 84 for judging whether the vehicle is in an under-steered state or in an over-steered state on the basis of the reference yaw rate $Y_B$ and the actual yaw rate Y; a sign determining means 85 for selectively adding a "+" or "−" sign to an output from the limiting means 83 to output the same on the basis of the detection value detected by the steering sensor 14 and a result of the judgment in the steered-state judging means 84; adding means $86_L$ and $86_R$ for adding, to outputs from the switch means $79_L$ and $79_R$, respectively, the output from the limiting means 83 to which the "+" or "−" sign are affixed; and switch means $87_L$ and $87_R$ for switching over following two states from one to another: a state 1) in which control quantities determined in the adding means $86_L$ and $86_R$ are selected and applied to the linear solenoids $23_{RL}$ and $23_{RR}$ of the modulators $17_{RL}$ and $17_{RR}$, respectively, when the output from the OR gate 48 is of a low level, and a state 2) in which control quantities determined in the reference control quantity determining means $73_L$ and $73_R$ are applied to the linear solenoids $23_{RL}$ and $23_{RR}$, respectively, when the output from the OR gate 48 is of a high level.

The braking force for each of the front wheels is determined in the control quantity calculating circuit 66 in the front wheel-side control section 49 in accordance with the target deceleration $G_0$. The reference control quantity determining means $73_L$ and $73_R$, each determine a control quantity for providing a value which is obtained by equally dividing, into left and right sides, the rear wheel braking forces, which is obtained by reducing the braking forces for the front wheels at a given rate. The same control quantity is determined in the reference control quantity determining means $73_L$ and $73_R$. The distribution ratio determining means $74_L$ and $74_R$ each determine a distribution ratio of the braking forces for the left and right rear wheels on the basis of the lateral acceleration. In the control quantity calculating means $75_L$ and $75_R$, the control quantities for providing braking forces of the left and right rear brakes $B_{RL}$ and $B_{RR}$, required during turning of the vehicle, are calculated on the basis of the distribution ratio determined in the above manner. The control quantities, calculated in the control quantity calculating means $75_L$ and $75_R$, are used only when the leftward or rightward steering angle exceeds, for example, 30 degrees. When the leftward or rightward steering angle is equal to or less than 30 degrees, the reference control quantities, determined in the reference control quantity calculating means $73_L$ and $73_R$, are delivered from the switch means $79_L$ and $79_R$, respectively.

The sign determining means 85 determines that the vehicle is turning leftward or rightward, on the basis of the detection value, detected by the steering sensor 14, when the PID calculation quantity, which is limited by the limiting means 83 after being calculated in the PID calculating means 80, is to be added by each of the adding means $86_L$ and $86_R$. More specifically, the sign determining means 85 adds, to the output from the limiting means 83, the "−" sign for the inner wheel side, and the "+" sign for the outer wheel side, and delivers these values to the respective adding means $86_L$ and $86_R$, when it has been decided that the vehicle is in the over-steered state, and adds, to the output from the limiting means 83, the "−" sign for the outer wheel side and the "+" sign for the inner wheel side, and delivers these values to the respective adding means $86_L$ and $86_R$, when it has been decided that the vehicle is in the under-steered state, so that the sum total of the braking forces obtained in the rear wheel brakes $B_{RL}$ and $B_{RR}$ is not varied.

In the limiting means 83, when the output from the PID calculating means 80 is equal to, or more than, an output from the low selection means 81, i.e., lower one of the outputs from the switch means $79_L$ and $79_R$, the output from the PID calculating means 80 is limited in the limiting means 83 by use of the lower one of the outputs from the switch means $79_L$ and $79_R$ as the maximum value, thereby avoiding that the control quantity assumes a negative value in each of the adding means $86_L$ and $86_R$.

By such a rear wheel control section 50, when the vehicle speed $V_V$ is equal to, or more than, 10 km/hr and the speed of operation of the brake pedal $P_B$ is slow, the linear solenoids $23_{RL}$ and $23_{RR}$ in the modulators $17_{RL}$ and $17_{RR}$ are independently controlled, in a feed-back manner, on the basis of operation control quantities $P_Y$RL and $P_Y$RR obtained by subjecting, to a PID correction, the control quantities determined by the target deceleration $G_0$ and the reference yaw rate $Y_B$. On the other hand, either when the speed of operation of the brake pedal $P_B$ is fast, or when the vehicle speed $V_V$ is less than 10 km/hr, the linear solenoids $23_{RL}$ and $23_{RR}$, in the modulators $17_{RL}$ and $17_{RR}$, are independently controlled in an open manner on the basis of the control quantities $P_Y$RL and $P_Y$RR determined by the target deceleration $G_0$ and the reference yaw rate $Y_B$.

The operation of this embodiment will be described below. The front wheel-side control section 49 collectively controls the linear solenoids $23_{FL}$ and $23_{FR}$ of the modulators $17_{FL}$ and $17_{FR}$, so that the deceleration $G_0$ is equal to the target deceleration $G_0$, thereby to control the braking forces of the front wheels $B_{FL}$ and $B_{FR}$ to the same level. The rear wheel-side control section 50 independently controls the linear solenoids $23_{RL}$ and $23_{RR}$ of the modulators $17_{RL}$ and $17_{RR}$, so that the actual yaw rate Y, at the actual turning level, is equal to the reference yaw rate $Y_B$, at the target turning level, thereby to produce a difference between the braking forces of the rear wheel brakes $B_{RL}$ and $B_{RR}$. Thus, it is possible to perform the control of the deceleration for the front wheels $W_{FL}$ and $W_{FR}$ in which the load is increased during braking, and to perform the control of the turning for the rear wheels $W_{RL}$ and $W_{RR}$ which largely contributes to the control of the turning, thereby to provide a sufficient braking force while stabilizing the behavior of the vehicle during braking in turning of the vehicle.

In addition, by controlling the linear solenoids $23_{FL}$ and $23_{FR}$ of the modulators $17_{FL}$ and $17_{FR}$, by the front wheel-side control section 49, it is possible to avoid the generation of an overshooting to improve the responsiveness of the control. Also, it is possible to eliminate an influence of pitching during traveling of the vehicle. The control of braking force, corresponding to a variation in quantity of operation of the brakes shown in FIG. 7 by the front wheel-side control section 49, will be described below.

For a period $T_1$ from the start of the control section 49 to a time point $t_1$ at which the braking operation is started, an initial setting is performed. For a period $T_2$ from the time point $t_1$ to a time point $t_2$, the open control of the linear solenoids $23_{FL}$ and $23_{FR}$ is carried out by using a value calculated in the control quantity calculating circuit 66 as the operation control quantity $P_{YF}$ in response to the speed-level judging means 42 judging that the operation of the brakes is fast. This insures a quick responsiveness, but also eliminates an influence of pitching generated in the vehicle because the deceleration used by the deceleration sensor 15 in the control is not used. At this time, since this is a first fast braking (hard braking) after the start of the control section 49, the value of $\alpha_0$, used in the calculation in the control quantity calculating circuit 66, is a value received thereto from the reference terminal 69.

When the braking operation is shifted into a slow, or low-speed, braking operation at the time point $t_2$, a low level signal, indicative of the slow braking operation, is delivered from the speed-level judging means 42 at a time point $t_3$ outputted by a delay time determined in the speed-level judging means 42. For a period $T_3$, from the time point $t_2$ to the time point $t_3$, the open control remains continued, thereby avoiding the generation of a hunting to provide a stabilization of the control.

For a period $T_4$, from the time point $t_3$ to a time point $t_4$, at which the braking is once ended, the feed-back control of the linear solenoids $23_{FL}$ and $23_{FR}$ of the modulators $17_{FL}$ and $17_{FR}$ is carried out using the operation control quantity $P_{YF}$ determined in the deviation reference control quantity determining means 61. But this feed-back control is carried out after the completion of the open control corresponding to the fast braking. Therefore, a cause of an overshooting is already not present, Thereby ensuring that the linear solenoids $23_{FL}$ and $23_{FR}$ are controlled, such that the deceleration G is equal to the target deceleration $G_0$. Moreover, for this period $T_4$, a calculation for averaging the past four values of $\alpha$, sequentially inputted from the input/output relation calculating circuit 67 to provide an average value $\alpha_{NEXT}$, is repeatedly performed in the hysteresis calculating circuit 68.

When the braking operation is restarted at a time point $t_5$, a period $T_5$, from the time point $t_4$ to a time point $t_5$, is a period for ascertaining whether or not the value calculated in the hysteresis calculating circuit 68 should be returned to the initial value, until the braking pressure is stabilized. If the period $T_5$ is shorter than the delay time set in the operation-end judging circuit 41, the value calculated in the hysteresis calculating circuit 68 is not returned to the initial value.

If it is decided that the braking is fast for a period $T_6$ from the time point $t_5$ to a time point $t_6$, because the period $T_5$ was shorter than the delay time set in the operation-end judging circuit 41, a calculation, using the value $\alpha_{NEXT}$ calculated during the feed-back control for the period $T_4$, is carried out in the control quantity calculating circuit 66, and by the open control based thereon, the linear solenoids $23_{FL}$ and $23_{FR}$ are controlled. Moreover, in this open control, the relationship between the target deceleration $G_0$ and the control quantity $P_{YF}$ is changed in the control quantity calculating circuit 66 on the basis of the past hysteresis of the relationship between the target deceleration $G_0$ and the control quantity $P_{YF}$ in the execution of the latest feed-back control. Therefore, even if the operation characteristic of the brakes $B_{FL}$ and $B_{FR}$, relative to the control quantity, has been varied, due to wearing of friction pads in the brakes $B_{FL}$ and $B_{FR}$, a variation in temperature, and the like, an appropriate control quantity, corresponding to such variations in situations, can be obtained, and the convergence of the opening control can be improved.

A period $T_7$, between the time point $t_6$ at which the fast braking is ended and a time point $t_7$ at which the delay time set in the speed-level judging means 42 is lapsed, is similar to the above-described period $T_3$, and a period $T_8$, from the time point $t_7$ to a time point $t_8$ at which the slow braking is ended, is similar to the above-described period $T_4$.

If the braking operation is restarted at a time point $t_9$ after a lapse of a period $T_9$, longer than the delay time set in the operation-end judging means 40 from the time point $t_8$, the calculation value in the hysteresis calculating circuit 68 is returned to the initial value with the delivery of a high level signal from the operation-end judging means 40.

If the braking operation, started at the time point $t_9$, is fast, the control, similar to that for the above described period $T_2$, is carried out for a period $T_{10}$ during which the fast braking is continued.

Although the embodiment of the present invention has been described in detail, it will be understood that the present invention is not limited to the above-described embodiment, and various modifications in design can be made without departing from the spirit and scope of the invention defined in claims.

For example, the deceleration G of the vehicle may be obtained by differentiation of the vehicle speed $V_V$. And in place of the target deceleration $G_0$, the detection value detected by the load cell 13, or the calculation value determined in the control quantity calculating circuit 66, may be used as a value determined on the basis of the operation quantity detected by the load cell 13. Further, in place of the deceleration G, detected by the deceleration sensor 15, the calculation value, determined in the PID calculating circuit 64, or the control quantity determined in the adding circuit 65, may be used.

It should be noted that, in the above-described embodiment, for example, the deceleration G of the vehicle may be determined by the differentiation of the vehicle speed $V_V$, and the present invention is applicable to a braking force control system which is capable of independently controlling the braking forces of the left and right front wheel brakes $B_{FL}$ and $B_{FR}$.

A second embodiment of the present invention will now be described in connection with FIGS. 8 and 9. This embodiment has a feature in a control unit for controlling the braking forces of brakes, and the other arrangement and is similar to that in the previously-described first embodiment.

Figure 8:
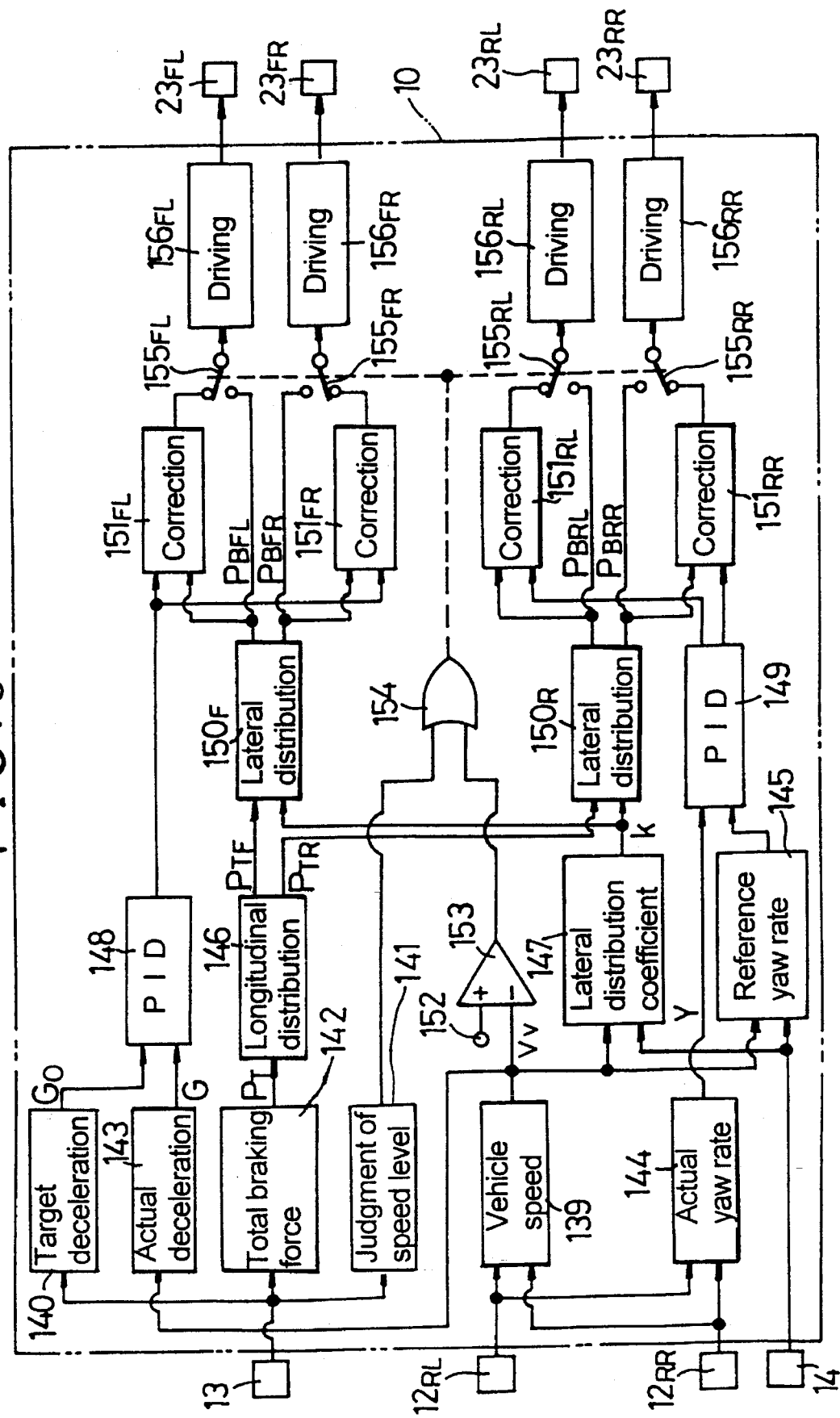
Figure 9:
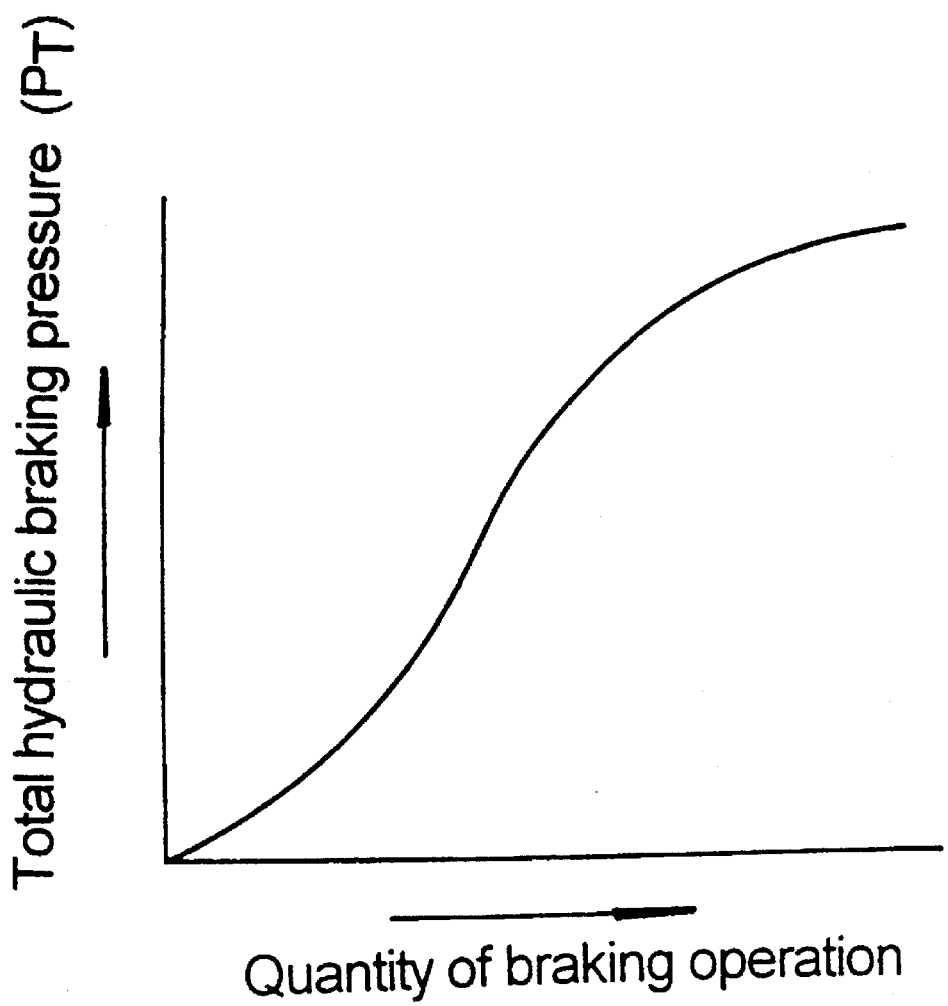

Referring to FIG. 8, the control unit 10 comprises a vehicle speed detecting means 139 for calculating a vehicle speed $V_V$, on the basis of detection values detected by the wheel speed detectors $12_{RL}$ and $12_{RR}$ for detecting the speeds of the left and right rear wheels $W_{RL}$ and $W_{RR}$, which are follower wheels; a target deceleration determining means for determining a target deceleration $G_0$, on the basis of the detection value detected by the load cell 13, i.e., the quantity of operation of the brake pedal $P_B$; a speed-level judging means 141 for judging the fast or slow level of the brake operation speed, in accordance with whether or not the variation per unit time in operation quantity detected by the load cell 13 exceeds a preset value; a total braking force determining means 142 for determining a total braking force which is a sum total of braking forces applied to the wheels $W_{FL}$, $W_{FR}$, $W_{RL}$ and $W_{RR}$, on the basis of the quantity of operation of the brake pedal $P_B$; an actual deceleration detecting means 143 for determining an actual deceleration G of the vehicle by differentiating the vehicle speed $V_V$; an actual yaw rate detecting means 144 for detecting an actual yaw rate which is an actual turning level of the vehicle on the basis of a difference between the detection values detected by the wheel speed detectors $12_{RL}$ and $12_{RR}$; a reference yaw rate determining means 145, for determining a reference yaw rate $Y_B$, which is a target turning level on the basis of the vehicle speed determined in the vehicle speed detecting means 39 and the detection value detected by the steering sensor 14; a longitudinal distribution quantity determining means 146, for distributing the total braking force determined in the total braking force determining means 142, in accordance with a predetermined ratio of load shared longitudinally of the vehicle, to determine front wheel-side braking forces to be applied to the front wheels $W_{FL}$ and $W_{FR}$ and rear wheel-side braking forces to be applied to the rear wheels $W_{RL}$ and $W_{RR}$; a lateral distribution factor determining means 147, for determining braking force distribution factors for the left and right wheels on the basis of the vehicle speed $V_V$ and the detection value detected by the steering sensor 14. Further, the control unit 10 includes a PID calculating means 148 for PID-calculating a correction based on a deviation between the target deceleration $G_0$ and the actual deceleration G; a PID calculating means 148 for calculation of a correction value based on a deviation between the reference yaw rate $Y_B$ and the actual yaw rate Y; a front wheel-side lateral distribution quantity determining means $150_F$ for determining reference braking forces for the front wheels $W_{FL}$ and $W_{FR}$ by multiplying the front wheel-side braking forces determined in the longitudinal distribution quantity determining means 146 by the braking force distribution factor determined in the lateral distribution factor determining means 147; a rear wheel-side lateral distribution quantity determining means $150_R$ for determining reference braking forces for the rear wheels $W_{RL}$ and $W_{RR}$ by multiplying the rear wheel-side braking forces determined in the longitudinal distribution quantity determining means 146 by the braking force distribution factor determined in the lateral distribution factor determining means 147; a left front wheel-side correcting means $151_{FL}$ for correcting the reference braking force for the left front wheel $W_{FL}$ determined in the front wheel-side lateral distribution quantity determining means $150_F$ by means of a correction value determined in the PID calculating means 148; a right front wheel-side correcting means $151_{FR}$ for correcting the reference braking force for the right front wheel $W_{FL}$, determined in the front wheel-side lateral distribution quantity determining means $150_F$ by means of a correction value determined in the PID calculating means 148; a left rear wheel-side correcting means $151_{RL}$ for correcting the reference braking force for the left rear wheel $W_{RL}$, determined in the rear wheel-side lateral distribution quantity determining means $150_R$, by means of a correction value determined in the PID calculating means 149; a right rear wheel-side correcting means $151_{RR}$, for correcting the reference braking force for the right rear wheel $W_{RR}$, determined in the rear wheel-side lateral distribution quantity determining means $150_R$ by means of a correction value determined in the PID calculating means 149; a comparator 153 for delivering a high level signal, when the vehicle speed $V_V$ is lower then a judging speed received thereinto from a reference terminal 152, e.g., 10 km/hr.; an OR gate into which output signals from the speed-level judging means 141 and the comparator 153 are received, in parallel; driving means $156_{FL}$, $156_{FR}$, $156_{RL}$ and $156_{RR}$ for independently driving the linear solenoids $23_{FL}$, $23_{FR}$, $23_{RL}$ and $23_{RR}$, respectively; a switch circuit $151_{FL}$ for alternatively selecting one of the front wheel-side lateral distribution quantity determining means $150_F$ and the left front wheel-side correcting means $151_{FL}$ to connect it to the driving means $156_{FL}$; a switch circuit $151_{FR}$ for alternatively selecting one of the front wheel-side lateral distribution quantity determining means $150_R$ and the right front wheel-side correcting means $151_{FR}$ to connect it to the driving means $156_{FR}$; a switch circuit $151_{RL}$ for alternatively selecting one of the rear wheel-side lateral distribution quantity determining means $150_R$ and the left rear wheel-side correcting means $151_{RL}$ to connect it to the driving means $156_{RL}$; and a switch circuit $151_{RR}$ for alternatively selecting one of the rear wheel-side lateral distribution quantity determining means $150_R$ and the right rear wheel-side correcting means $151_{RR}$ to connect it to the driving means $156_{RR}$.

When the wheel brakes $B_{FL}$, $B_{FR}$, $B_{RL}$ and $B_{RR}$ of the same specification are mounted on the four wheel $W_{FL}$, $W_{FR}$, $W_{RL}$ and $W_{RR}$, respectively, braking forces exhibited by the wheel brakes $B_{FL}$, $B_{FR}$, $B_{RL}$ and $B_{RR}$ are proportional to braking fluid pressures independently controlled by the modulators $17_{FL}$, $17_{FR}$, $17_{RL}$ and $17_{RR}$, respectively, and the total braking force, which is a sum total of the braking forces applied to the four wheel $W_{FL}$, $B_{FR}$, $B_{RL}$ and $B_{RR}$, can be determined as a total braking fluid pressure. In the total braking force determining means 142, the total braking fluid pressure $P_T$, to be applied to the wheel brakes $B_{FL}$, $B_{FR}$, $B_{RL}$ and $B_{RR}$, is determined on the basis of a map previously established in accordance with the quantity of operation of the brake pedal, as shown in FIG. 9.

In the actual yaw rate detecting means 144, the actual yaw rate Y is determined by multiplying a difference between the detection values, detected by the wheel speed detectors $12_{RL}$ and $12_{RR}$ for detecting the speeds of the left and right rear wheels $W_{RL}$ and $W_{RR}$, which are the follower wheels, by predetermined constants for treads of the left and right rear wheels $W_{RL}$ and $W_{RR}$. In the reference yaw rate determining means 145, a reference value, which is a standard for a yaw rate to be generated when a steering of a certain quantity is carried out at a certain vehicle speed, is set as the reference yaw rate $Y_B$ in accordance with the vehicle speed $V_V$ and the steered quantity.

The output signal from the speed-level judging means 141 and the output signal from the comparator circuit 153 are received, in parallel, into the OR gate. The OR gate 154 delivers a high level signal, when at least one has been established of a state in which the speed of operation of the brake pedal $P_B$ is fast and a state in which the vehicle speed $V_V$ is lower than the judging speed, e.g., 10 km/hr.

The longitudinal distribution quantity determining means 146 distributes the total braking fluid pressure $P_T$ from the total braking force determining means 142 longitudinally of the vehicle to provide a total braking fluid pressure $P_{TF}$ to be applied to the left and right front wheel brakes $B_{FL}$ and $B_{FR}$ and a total braking fluid pressure $P_{TR}$ to be applied to the left and right rear wheel brakes $B_{RL}$ and $B_{RR}$.

The lateral distribution factor determining means 147 determines a lateral distribution factor k for determining a proportion of distribution of the braking forces for the left and right wheels in correspondence to a lateral deceleration of the vehicle presumed on the basis of the vehicle speed $V_V$ and the steered quantity.

The PID calculating means 148 provides a correction value for correcting the braking fluid pressure, so that the deviation between the target deceleration $G_0$ and the actual deceleration G is decreased. When the target deceleration minus the actual deceleration is equal to a positive numerical value, the PID calculating means 148 delivers a positive correction value which is larger, as such numerical value is larger. On the other hand, when the target deceleration, minus the actual deceleration, is equal to a negative numerical value, the PID calculating means 148 delivers a negative correction value which is larger, as such numerical value is larger.

The PID calculating means 149 provides a correction value for correcting the braking fluid pressure, so that the deviation between the reference yaw rate $Y_B$ and the actual yaw rate Y is decreased. The PID calculating means 149 delivers different correction values for the left and right sides in accordance with the deviation between the reference yaw rate $Y_B$ and the actual yaw rate Y and the direction of turning of the vehicle. For example, if the reference yaw rate $Y_B$, minus the actual yaw rate Y, is equal to a positive numerical value when the vehicle is being turned rightwardly, the correction value for the right side is a larger value, while the correction value for the left side is a negative value whose absolute value is larger, as such numerical value is larger. On the contrary, if the reference yaw rate $Y_B$, minus the actual yaw rate Y, is equal to a negative numerical value, the correction value for the right side is a negative value whose absolute value is larger, while the correction value for the left side is a large positive value.

The front wheel-side lateral distribution quantity determining means $150_F$ distributes the total braking fluid pressure $P_{TF}$ for the front wheel received from the longitudinal distribution quantity determining means 146 to the left and right front wheel brakes $B_{FL}$ and $B_{FR}$ in accordance with the lateral distribution factor k received from the lateral distribution factor determining means 147. Thus, a reference braking fluid pressure $P_{BFL}$, to be applied to the left front wheel brake $B_{FL}$, in correspondence to a reference braking force to be provided in the left front wheel $W_{FL}$ in accordance with the ratio of load shared longitudinally and laterally of the vehicle, and a reference braking fluid pressure $P_{BFR}$ to be applied to the right front wheel brake $B_{FR}$ in correspondence to a reference braking force to be provided in the right front wheel $W_{FR}$ in accordance with the ratio of load shared longitudinally and laterally of the vehicle, are delivered from the front wheel-side lateral distribution quantity determining means $150_F$.

The rear wheel-side lateral distribution quantity determining means $150_R$ distributes the total braking fluid pressure $P_{TR}$ for the rear wheels received from the longitudinal distribution quantity determining means 146 to the left and right rear wheel brakes $B_{RL}$ and $B_{RR}$ in accordance with the lateral distribution factor k from the lateral distribution factor determining means 147. Thus, a reference braking fluid pressure $P_{BRL}$, to be applied to the left rear wheel brake $B_{RL}$ in correspondence to a reference braking force to be provided in the left rear wheel $W_{RL}$ in accordance with the ratio of load shared longitudinally and laterally of the vehicle, and a reference braking fluid pressure $P_{BRR}$ to be applied to the right rear wheel brake $B_{RR}$ in correspondence to a reference braking force to be provided in the right rear wheel $W_{RR}$, in accordance with the ratio of load shared longitudinally and laterally of the vehicle, are delivered from the rear wheel-side lateral distribution quantity determining means $150_R$.

The correcting means $151_{FL}$ performs a calculation consisting in adding an output from the PID calculating means 148 to an output from the front wheel-side lateral distribution quantity determining means $150_F$. Thus, the reference braking fluid pressure $P_{BFL}$, corresponding to the reference braking force for the left front wheel $W_{FL}$ determined in the front wheel-side lateral distribution quantity determining means $150_F$, is corrected in the correcting means $151_{FL}$ by the correction value determined in the PID calculating means 148, and a braking fluid pressure corresponding to a braking force and resulting from the correction of the reference braking force for the left front wheel $W_{FL}$ is delivered from the correcting means $151_{FL}$.

The correcting means $151_{FR}$ performs a calculation consisting in adding an output from the PID calculating means 148 to an output from the front wheel-side lateral distribution quantity determining means $150_F$. In addition, each of the correcting means $151_{RL}$ and $151_{RR}$ performs a calculation consisting in adding an output from the PID calculating means 149 to an output from the rear wheel-side lateral distribution quantity determining means $150_R$. Thus, braking fluid pressures, corresponding to braking forces and resulting from the correction of the reference braking forces for the right front wheel $W_{FL}$ and the left and right rear wheels $W_{RL}$ and $W_{RR}$, are delivered from the correcting means $151_{FR}$, $151_{RL}$ and $151_{RR}$, respectively.

Each of the switch circuits $155_{FL}$, $155_{FR}$, $155_{RL}$ and $155_{RR}$ is switched over, between switching modes, in response to an output from the OR gate 154. When the output from the OR gate 154 is of a low level, each of the switch circuits $155_{FL}$, $155_{FR}$, $155_{RL}$ and $155_{RR}$ is brought into a switching mode in which it permits each of the correcting means $155_{FL}$, $155_{FR}$, $155_{RL}$ and $155_{RR}$ to be a corresponding one of the driving means $156_{FL}$, $156_{FR}$, $156_{RL}$ and $156_{RR}$. When the output from the OR gate 154 is of a high level, each of the switch circuits $155_{FL}$, $155_{FR}$, $155_{RL}$ and $155_{RR}$ is brought into a switching mode in which it permits the front wheel-side lateral distribution quantity determining means $150_F$ to be connected to the driving means $156_{FL}$ and the $156_{FR}$, while at the same time, permitting the rear wheel-side lateral distribution quantity determining means $150_R$ to be connected to the driving means $156_{RL}$ and the $156_{RR}$.

Each of the driving means $156_{FL}$, $156_{FR}$, $156_{RL}$ and $156_{RR}$ delivers a driving signal, corresponding to a received braking fluid pressure, to drive a corresponding one of the linear solenoids $23_{FL}$, $23_{FR}$, $23_{RL}$ and $23_{RR}$, whereby a braking fluid pressure, for providing a desired braking force, is delivered from each of the modulators $17_{FL}$, $17_{FR}$, $17_{RL}$ and $17_{RR}$.

It should be noted that the speed-level judging means 141 has construction similar to that in the first embodiment. In addition, no deceleration sensor is used.

The operation of the second embodiment will be described below. When the vehicle speed $V_V$ is, for example, equal to or more than 10 km/hr., and the speed of operation of the brake pedal $P_B$ is slow, the braking fluid pressures, after correction by the correcting means $151_{FL}$ and $151_{FR}$, are applied to the left and right front wheel brakes $B_{FL}$ and $B_{FR}$, while the braking fluid pressures, after correction by the correcting means $151_{RL}$ and $151_{RR}$, are applied to the left and right rear wheel brakes $B_{RL}$ and $B_{RR}$. In each of the correcting means $151_{FL}$ and $151_{FR}$ for the left and right front wheels, a braking fluid pressure is obtained which corresponds to a braking force determined by correcting, on the basis of the deviation between the target deceleration $G_0$ of the vehicle based on the quantity of operation of the brake pedal and the deceleration G of the vehicle, the reference braking force for the front wheels, which is determined on the basis of the longitudinally shared load ratio and the laterally shared load ratio determined from the vehicle speed $V_V$ and the steered quantity, and for the left and right front wheels increased in load during braking, a deceleration feed-back control of the reference braking force is carried out in consideration of a difference in grounding load between the inner and outer wheels during turning of the vehicle. This makes it possible to prevent the locking of the left and right front wheels $W_{FL}$ and $W_{FR}$ from occurring during turning of the vehicle, and to provide a sufficient reduction in speed. In each of the correcting means $151_{RL}$ and $151_{RR}$ for the left and right rear wheels, a braking fluid pressure is obtained which corresponds to a braking force determined by correcting, on the basis of the deviation between the reference yaw rate $Y_B$, as a target turning level based on the steered quantity and the vehicle speed $V_V$ and the detected actual yaw rate Y, as a turning level of the vehicle, the reference braking force for the rear wheels which is determined on the basis of the longitudinally shared load ratio and the laterally shared load ratio determined from the vehicle speed $V_V$ and the steered quantity, and for the left and right rear wheels $W_{FL}$ and $W_{FR}$ largely contributing to a control of turning, the control of turning is carried out, thereby enabling the behavior of the vehicle to be stabilized.

In this case, because the deceleration feed-back control is carried out for the front wheels $W_{FL}$ and $W_{FR}$, and the turning-level feed-back control is carried out for the rear wheels $W_{RL}$ and $W_{RR}$, the subjects of the feed-back controls are different from each other and therefore, an interference of the feed-back controls cannot be produced. In addition, because the reference braking forces for the wheels are determined in the front wheel-side lateral distribution quantity determining means $150_F$ and the rear wheel-side lateral distribution quantity determining means $150_R$, on the basis of the ratio of load shared to the wheels during turning of the vehicle, reference braking forces balanced optimally may be corrected in the correcting means $151_{FL}$, $151_{FR}$, $151_{RL}$ and $151_{RR}$ and hence, a small correcting quantity is only required, thereby providing an improved responsiveness of the control.

Either when the speed of operation of the brake pedal $P_B$ is fast, or when the vehicle speed $V_V$ is, for example, lower than 10 km/hr., the operation of each of the linear solenoids $23_{FL}$, $23_{FR}$, $23_{RL}$ and $23_{RR}$ is controlled so as to provide reference braking fluid pressures $P_{BRL}$, $P_{BFR}$, $P_{BFL}$ and $P_{BRR}$ determined in the front wheel-side lateral distribution quantity determining means $150_F$ and the rear-side lateral distribution quantity determining means $150_R$, respectively, thereby preventing an overshooting of the control from being produced.

In the above-described embodiment, for example, the deceleration G of the vehicle maybe detected by a deceleration sensor mounted on the vehicle; and the total braking force determining means 42 may be omitted and instead, a target deceleration $G_0$, determined in the target deceleration determining means 40, may be used as a signal indicative of a total braking force.

Further, although the total braking fluid pressure $P_{TF}$ for the front wheels and the total braking fluid pressure $P_{TR}$ for the rear wheels have been determined in the longitudinal distribution quantity determining means 146 shown in FIG. 8 in accordance with the distribution proportion preset in a stationary state of the vehicle, it should be understood that the actual deceleration G, detected by the actual deceleration detecting means 143, is applied to the longitudinal distribution quantity determining means 146, where the distribution proportion in such stationary state may be corrected on the basis of the actual deceleration G, and a total braking fluid pressure $P_{TF}$ for the front wheels and a total braking fluid pressure $P_{TR}$ for the rear wheels may be determined in accordance with a distribution proportion obtained after the correction. If doing so, the longitudinal distribution of the braking fluid pressure can be more adapted for that in a dynamic state.

What is claimed is:

1. A braking force control system of a vehicle for independently controlling at least braking forces of front wheel brakes, a braking force of a left rear wheel brake and a braking force of a right rear wheel brake, said control system comprising front wheel-side control means for controlling the braking forces of said front wheel brakes together by feeding-back to said front wheel brakes a target deceleration of said front wheels derived from an operation of a brake operating member and a deceleration of the vehicle detected by deceleration detecting means; and rear wheel-side control means for independently controlling the braking forces of the left rear wheel brake and the right rear wheel brake by feeding-back to each of said left rear and right rear brakes a turning level of the vehicle detected by turning-level detecting means and a target turning level of the vehicle.

2. A braking force control system of a vehicle according to claim 1, wherein said front wheel-side control means comprises:

brake operation quantity detecting means for detecting the quantity of operation of the brake operating member;

target deceleration determining means for determining the target deceleration of the vehicle on the basis of a detection value detected by said brake operation quantity detecting means; and a front wheel-side control circuit for controlling the braking forces of the front wheel brakes together on the basis of outputs from said target deceleration determining means and said deceleration detecting means, so that the deceleration of the vehicle becomes equal to said target deceleration.

3. A braking force control system for a vehicle according to claim 1, wherein said rear wheel-side control means comprises:

steering quantity detecting means for detecting a steering quantity;

vehicle speed detecting means for detecting a vehicle speed;

target turning-level determining means for determining the target turning level of the vehicle on the basis of detection values detected by said steering quantity detecting means and said vehicle speed detecting means; and a rear wheel-side control circuit for independently controlling the braking forces on the left and right rear wheel brakes on the basis of outputs from said target turning-level determining means and said turning-level detecting means, so that the turning level of the vehicle becomes equal to said target turning level.

4. A braking force control system of a vehicle according to claim 1, further including:

brake operation quantity detecting means for detecting the quantity of operation of the brake operating member;

total braking force determining means for determining a total braking force which is a sum total of the braking forces of the brakes on the basis of a detection value detected by said brake operation quantity detecting means; and reference braking force determining means for determining a reference braking force for every brake by distributing said total braking force in accordance with a shared load ratio defined for every brake; and wherein said front wheel-side control means comprises:

target deceleration determining means for determining the target deceleration of the vehicle on the basis of the detection value detected by said brake operation quantity detecting means;

front wheel-side correcting means for correcting the reference braking force for every front wheel on the basis of a deviation between said target deceleration and the detected deceleration; and front wheel-side driving means for driving each front wheel brake on the basis of the corrected reference braking force; and said rear wheel-side control means comprises:

steering quantity detecting means for detecting a steering quantity;

vehicle speed detecting means for detecting a vehicle speed;

turning level detecting means for detecting the turning level of the vehicle;

target turning-level determining means for determining the target turning level of the vehicle on the basis of detection values detected by said steering quantity detecting means and said vehicle speed detecting means;

rear wheel-side correcting means for correcting the reference braking force for each rear wheel on the basis of a deviation between said target turning level and the detected turning level; and rear wheel-side driving means for driving each rear wheel brake on the basis of the corrected reference braking force.

5. A braking force control system of a vehicle, capable of independently controlling at least braking forces of front wheel brakes, a braking force of a left rear wheel brake and a braking force of a right rear wheel brake, comprising:

brake operation quantity detecting means for detecting a quantity of operation of a brake operating member;

deceleration detecting means for detecting a deceleration of the vehicle;

target deceleration determining means for determining a target deceleration of the vehicle on the basis of a detected value detected by said brake operation quantity detecting means;

steering quantity detecting means for detecting a vehicle speed;

turning level detecting means for detecting a turning level of the vehicle;

target turning level determining means for determining a target turning level of the vehicle on the basis of detection values detected by said steering quantity detecting means and said vehicle speed detecting means;

a front wheel-side control means for controlling the braking forces of the front wheel brakes together on the basis of outputs from said target deceleration determining means and said deceleration detecting means, so that the deceleration of the vehicle becomes equal to said target deceleration; and a rear wheel-side control means for controlling at least one of the braking forces of the left rear wheel brake and the right rear wheel brake independently from each other on the basis of outputs from said target turning level determining means and said turning level detecting means to provide a difference between the brake forces of the rear wheel brakes, so that the turning level of the vehicle becomes equal to said target turning level.

6. A braking force control system of a vehicle according to claim 5, further including:

total braking force determining means for determining a total braking force which is a sum total of the braking forces of the brakes on the basis of a detection value by said brake operation quantity detecting means; and reference braking force determining means for determining a reference braking force for every brake by distributing said total braking force in accordance with a shared load ratio defined for every brake; and wherein said front wheel-side control means includes a front wheel-side correcting means for correcting the reference braking force for each front wheel on the basis of a deviation between said target deceleration and the detected deceleration, and controls braking force of the front wheel brakes together on the basis of the corrected reference braking forces; and said rear wheel-side control means includes a rear wheel-side correcting means for correcting the reference braking force for each rear wheel on the basis of a deviation between said target turning level and the detected turning level, and controls the braking forces of the rear wheel brakes on the basis of the corrected reference braking forces.

7. A braking force control system of a vehicle capable of independently controlling at least braking forces of front wheel brakes together, a braking force of a left rear wheel brake and a braking force of a right rear wheel brake, comprising:

brake operation quantity detecting means for detecting a quantity of operation of a brake operating member;

total braking force determining for determining a total braking force which is a sum of the braking forces of the front and rear wheel brakes on the basis of a detection value detected by said brake operation quantity detecting means;

reference braking force determining means for determining reference braking forces for the brakes by distributing the total braking force in accordance with a shared load ratio defined for every brake;

deceleration detecting means for detecting a deceleration of the vehicle;

target deceleration determining means for determining a target deceleration of the vehicle on the basis of the detection value detected by said brake operation quantity detection means;

front wheel-side correcting means for correcting the reference braking force for the front wheel brakes together on the basis of a deviation between said target deceleration and the detected deceleration;

steering quantity detecting means for detecting a steering quantity;

vehicle speed detecting means for detecting a vehicle speed;

turning level detecting means for detecting a turning level of the vehicle;

target turning level detecting means for detecting a target turning level of the vehicle on the basis of detecting values detected by said steering quantity detecting means and said vehicle speed detecting means;

rear wheel-side correcting means for correcting the reference braking force for each rear wheel on the basis of a deviation between said target turning level and the detected turning level; and driving means for driving each wheel brake on the basis of the corrected reference braking force.

* * * * *